(12) United States Patent
Imanaga et al.

(10) Patent No.: US 9,065,124 B2
(45) Date of Patent: Jun. 23, 2015

(54) BATTERY PACK AND METHOD FOR WELDING CELLS

(75) Inventors: Shoji Imanaga, Hitachi (JP); Kinya Aota, Hitachi (JP); Yoshihisa Tsurumi, Hitachinaka (JP); Masuhiro Onishi, Uji (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 2237 days.

(21) Appl. No.: 11/937,599

(22) Filed: Nov. 9, 2007

(65) Prior Publication Data

US 2008/0131765 A1 Jun. 5, 2008

(30) Foreign Application Priority Data

Nov. 10, 2006 (JP) ................................. 2006-304687
Feb. 28, 2007 (JP) ................................. 2007-048351

(51) Int. Cl.
*H01M 2/24* (2006.01)
*H01M 2/20* (2006.01)

(52) U.S. Cl.
CPC .............. *H01M 2/204* (2013.01); *H01M 2/206* (2013.01)

(58) Field of Classification Search
USPC ........................................................ 429/160
See application file for complete search history.

(56) References Cited

U.S. PATENT DOCUMENTS 5,578,392 A * 11/1996 Kawamura ....................... 429/99
2003/0215702 A1 * 11/2003 Tanjou et al. .................. 429/127

FOREIGN PATENT DOCUMENTS

| EP | 0727833 | | 8/1996 |
|---|---|---|---|
| JP | 57-032569 | | 2/1982 |
| JP | 57032569 | * | 2/1982 |
| JP | 57-182965 | | 11/1982 |
| JP | 57182965 | * | 11/1982 |
| JP | 61-8539 | | 3/1986 |
| JP | 8-287898 | | 11/1996 |
| JP | 08-287898 | | 11/1996 |
| JP | 2000-133227 | | 5/2000 |
| JP | 2001-266843 | | 9/2001 |
| JP | 2002-155394 | | 5/2002 |
| JP | 2002155394 A | * | 5/2002 |
| JP | 2004-164981 | | 6/2004 |
| JP | 2004-259584 | | 9/2004 |
| JP | 2004259584 A | * | 9/2004 |

OTHER PUBLICATIONS

Official Action issued in European Application No. 07021828.4 on Jan. 20, 2010.

* cited by examiner

*Primary Examiner* — Ula C Ruddock
*Assistant Examiner* — Daniel Gatewood
(74) *Attorney, Agent, or Firm* — Baker Botts L.L.P.

(57) ABSTRACT

A battery pack with a reduced resistance connection arrangement in which battery cells are arranged in rows in an insulating case and an electrode of each battery cell is coupled to an electrode of another battery cell through a connecting metallic plate. The connecting metallic plate is made of copper and is disposed on a positive electrode of one battery cell and a negative electrode of another battery cell to form a lap joint. Welds are formed in predetermined positions on the connecting metallic plate above the positive and negative electrodes by arc spot welding. The electrodes are formed of nickel-coated steel. The depth h of weld penetration in the weld is greater than the thickness T1 of the connecting metallic plate and smaller than the thickness T1 plus the thickness T2 of one of the electrodes, that is, $T1 < h \leq (T1+T2\times4/5)$.

16 Claims, 6 Drawing Sheets

BATTERY PACK AND METHOD FOR WELDING CELLS

BACKGROUND OF THE INVENTION

The present invention relates to a battery pack in which a positive electrode of a battery cell is connected to a negative electrode of another battery cell by a connecting metallic plate, and to a method for welding together the connecting metallic plate and each of the positive and negative electrodes.

A battery pack (also called battery modules) used in hybrid and electric vehicles and mobile devices require charging and discharging large currents and therefore dozens of battery cells connected in series. If the connection resistance (electric resistance) between them is large, conduction loss due to voltage drop increases and heat generation also increases, leading to degradation of characteristics and reduction of the life of the battery pack. Therefore, a number of methods have been proposed for reducing the connection resistance in the battery pack and for coupling battery electrodes of the battery cells.

JP-A-08-287898 proposes a cylindrical battery and a battery pack in which collecting terminals made of a conductive material having surfaces on which a female threaded screw hole or a male screw is provided are connected and fixed to positive and negative electrodes of battery cells through feet that support the surfaces.

JP-A-2004-164981 proposes a battery pack in which a plate made of an electrically insulating resin having a size smaller than the outer circumference of the battery pack is disposed on a positive cap of two battery cells, a projection having a polygonal recess is provided in a valley-like space between battery cells, and a metallic bus-bar that mechanically and electrically interconnects the battery cells is provided on the plate.

JP-A-2000-133227 proposes that metallic lead plates that project outside first and second battery cells are fixed on opposed electrode terminals of battery cells arranged in series and the surfaces of the metallic lead plates are brought into contact with each other.

JP-A-2001-266843 proposes a battery pack in which one of two types of projections of a connecting member is welded onto a sealing element of a battery cell and the other projection is welded onto the bottom surface of an exterior case of the other battery cell.

JP-A-2004-259584 proposes an enclosed battery, a method for manufacturing the enclosed battery, and a cover plate for the enclosed battery in which the backside of a cover plate that seals an opening of a battery case is formed in such a manner that a portion near a filling aperture is formed thinner than the periphery and the filling aperture is sealed by fusion between the thinner portion and a sealing plug.

JP-B2-61-8539 proposes a method for manufacturing a battery including a spiral electrode in which collecting elements, which are a substantially disc-like metallic plane plates, are provided on projecting ends of upper and lower electrodes of a spiral electrode element and the collecting elements are welded to the projecting ends of the electrodes, which intersect with and contact the collecting elements at right angles, by arc spot welding and then these are enclosed in a battery case.

BRIEF SUMMARY OF THE INVENTION

An object of the present invention is to provide a battery pack and a welding method therefor in which a good welding quality and a high tensile strength of weld joint are obtained, and an electric resistance between battery electrodes is low to keep an electric power loss low when electrically charging and discharging the battery pack so that a useful life of the battery pack is effectively increased.

For achieving the object, according to the invention, in a battery pack comprising a plurality of battery cells arranged to form at least one row in an electrically insulating case and a connecting metallic plate connecting an electrode of one of the battery cells to an electrode of the other one of the battery cells, the connecting metallic plate whose main component is copper is disposed on the positive electrode of the one of the battery cells and the negative electrode of the other one of the battery cells, and the connecting metallic plate and each of the positive and negative electrodes are fixed to each other to form a lap weld joint.

In particular, it is preferable that a depth h of melted region of the lap weld joint is greater than a thickness $T_1$ of the connecting metallic plate and smaller than a total amount of the thickness $T_1$ and a thickness $T_2$ of one of the positive and negative electrodes to satisfy a formula of $T_1 \leq h \leq (T_1+T_2 \times 4/5)$.

It is preferable of that the thickness $T_1$ of the connecting metallic plate is not less than 0.5 mm and not more than 1.5 mm, and the one of the positive and negative electrodes is a steel plate whose thickness $T_2$ is not less than 0.5 mm and not more than 1.5 mm and which includes front and back surfaces nickel-plated.

For achieving the object described above, a method for connecting through a connecting metallic plate an electrode of one of battery cells to an electrode of the other one of the battery cells forming at least one row in an electrically insulating case, comprises the steps of: disposing the connecting metallic plate whose main component is copper on the positive electrode of the one of battery cells and on the negative electrode of the other one of the battery cells; and applying an arc spot welding to each of a position on the connecting metallic plate above the positive electrode and another position on the connecting metallic plate above the negative electrode to form a lap weld joint. In this case, the battery pack in which an electric resistance between the electrodes is low to keep an electric power loss low when electrically charging and discharging the battery pack, is obtainable. Since an electric resistance of copper is significantly small in comparison with electric resistances of nickel and steel (Cu:1.55<Ni:6.58<Fe:8.71($\times 10^{-6}$ Ω·cm)), the connecting metallic plate whose main component is copper decreases the electric resistance between the electrodes, and is cheaper than a connecting metallic plate whose main component is Nickel. The connecting metallic plate whose main component is copper can securely form the lap weld joint by the arc spot welding. On the other hand, it is difficult for a resistance welding (spot welding) using conventional Joule heating to be applied to the copper of low electric resistance.

In particular, it is preferable that in the step of applying the arc spot welding, a depth h of melted region of the lap weld joint is greater than a thickness $T_1$ of the connecting metallic plate and smaller than a total amount of the thickness $T_1$ and a thickness $T_2$ of one of the positive and negative electrodes to satisfy a formula of $T_1 < h \leq (T_1+T_2 \times 4/5)$. In this case, the melted region is securely prevented from reaching a back surface of the one of the positive and negative electrodes as a reverse surface of the lap weld joint. Incidentally, when the depth h of melted region is smaller than the thickness $T_1$ of the connecting metallic plate, the welding is insufficient, and when the depth h of melted region is greater than ($T_1+T_2 \times 4/5$), a provability of that the melted region reaches the reverse surface of the lap weld joint is increased to cause a decrease in corrosion resistance and a battery liquid leakage.

It is preferable of that the thickness T1 of the connecting metallic plate is not less than 0.5 mm and not more than 1.5 mm, and the one of the positive and negative electrodes is a steel plate whose thickness T2 is not less than 0.5 mm and not more than 1.5 mm and which includes front and back surfaces nickel-plated. In this case, the nickel between the copper of low melting point and the iron of high melting point is effective to join the copper and iron each other to form a significantly thin Cu/Fe mixture layer restraining a break between the connecting metallic plate and the one of the positive and negative electrodes so that the good welding quality and the high tensile strength of the weld joint are obtained. Further, the Nickel increases the corrosion resistance of either of high-carbon steel and low-carbon steel as a material of the connecting metallic plate. A thickness of the nickel with which the connecting metallic plate is plated may be not less than 1 μm and not more than 10 μm to perform the welding between one of the positive and negative electrodes and the connecting metallic plate so that the non-breakable good weld join is formed. In this case, it is not preferable that the thickness T1 of the connecting metallic plate is less than 0.5 mm to decrease a strength of the connecting metallic plate and a strength of the weld joint so that a structure is not sufficient for vibration, and the thickness T1 of the connecting metallic plate is more than 1.5 mm to increase a thermal discharge through the connecting metallic plate so that the ark spot welding cannot be performed. Further, it is not preferable that the thickness T2 of the one of the positive and negative electrodes is less than 0.5 mm to decrease the strength of the one of the positive and negative electrodes and the strength of the weld joint so that the structure is not sufficient for vibration, and the thickness T2 of the one of the positive and negative electrodes is more than 1.5 mm to increase a difficulty in deep drawing for forming the one of the positive and negative electrodes, a weight thereof and a difficulty in the ark welding. Further, it is not preferable that the thickness of the nickel with which the connecting metallic plate is less than 1 μm to increase a provability of that a steel surface is exposed by a scratch or the like to decrease the corrosion resistance, and the thickness of the nickel with which the connecting metallic plate is more than 10 μm to cause an increase in time period for the plating and a poor weld of the ark spot welding.

If the connecting metallic plate and each of the positive electrode of the one of the battery cells and the negative electrode of the other one of the battery cells are fixed to each other at one of one position and two positions where the arc spot welding was performed, a good welding quality and a high tensile strength of the weld potion is obtained with a minimum number of the welded positions while connecting securely the positive and negative electrodes to each other and decreasing man-power.

Particularly, since the metallic welded portion is formed from the surface of the connecting metallic plate to an intermediate position of the thickness of each of the positive and negative electrodes, the welded portion is prevented from extending to a reverse surface of the lap joint to keep the Nickel plating layer on the reverse surface so that the corrosion resistance is kept even when each of the positive and negative electrodes is made of low carbon steel or high carbon steel.

Further, when the connecting metallic plate has at least two bent portions being distant from the positions at which the arc spot welding was performed and extending upward from at least one of the negative and positive electrodes, a stress generated by combining the battery cells and a vibration of a vehicle on which the battery is mounted is restrained from being applied to the welded portion.

According to the invention, a method for connecting through a connecting metallic plate an electrode of one of battery cells to an electrode of the other one of the battery cells, comprises the steps of: disposing the connecting metallic plate whose main component is copper on the positive electrode of the one of battery cells and on the negative electrode of the other one of the battery cells to from a lap joint; and applying an arc spot welding to each of a position on the connecting metallic plate above the positive electrode and another position on the connecting metallic plate above the negative electrode, so that the lap joint is welded to obtain a good welding quality and a high tensile strength of the weld joint. Further, an electric resistance between the battery cells is small, a power loss is restrained during electrical charging and discharging of the battery, and the connecting metallic plate made of copper is cheaper than a Nickel plate.

If when applying the arc spot welding, a depth h of melted region is greater than a thickness T1 of the connecting metallic plate and smaller than a total amount of the thickness T1 and a thickness T2 of one of the positive and negative electrodes to satisfy a formula of $T1 \leq h \leq (T1+T2\times4/5)$, the melted region is securely prevented from reaching a reverse surface of the lap joint.

The ark spot welding is performed with using a nonabrasive tungsten electrode to enable a copper member to be welded and the copper member and a steel member to be welded together, particularly, Cu of low melting point and Fe of high melting point are joined together through Nickel as metallic deposit to form a significantly thin layer as an alloy Cu/Fe for preventing a breakage therebetween so that the good welding quality and the high tensile strength of the joint are obtained. Further, by a welding condition for preventing the melted region from reaching the reverse surfaces of the positive and negative electrodes or a heating condition corresponding thereto, the melted region as the joint extends from the surface of the connecting metallic plate to the intermediate position of the thickness of each of the positive and negative electrodes so that the melted portion is prevented from reaching the reverse surface of the lap joint.

Other objects, features and advantages of the invention will become apparent from the following description of the embodiments of the invention taken in conjunction with the accompanying drawings.

DETAILED DESCRIPTION OF THE INVENTION

Figure 1:
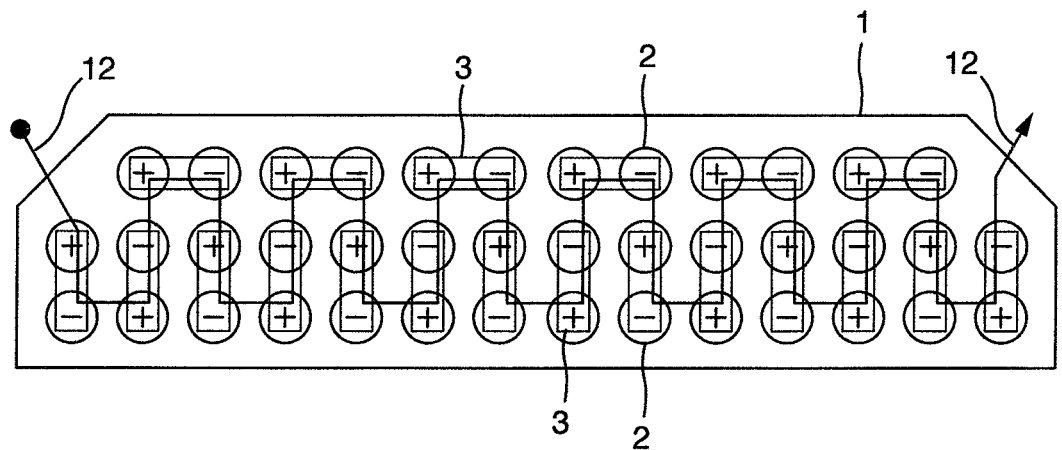
FIG. 1 is a diagram illustrating an arrangement of battery cells, connections between battery positive and negative electrodes, and current paths of a battery pack according to one exemplary embodiment of the present invention.
Figure 2:
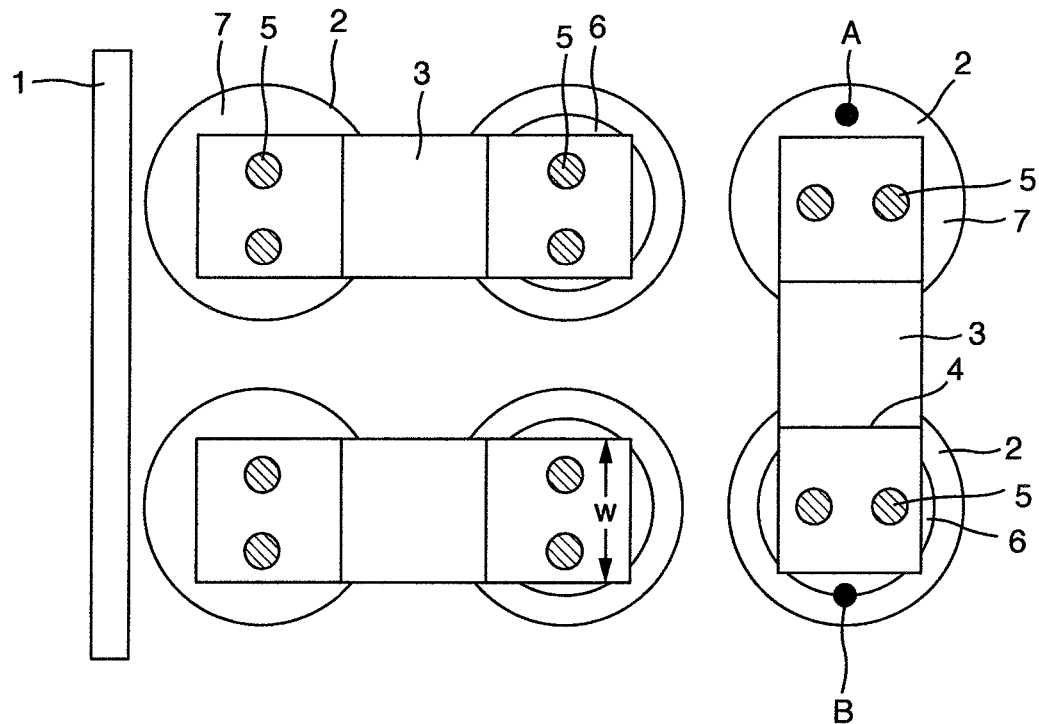
FIG. 2 is a top view showing connections between battery positive and negative electrodes, relating to a battery pack and a welding method therefor.
Figure 3:
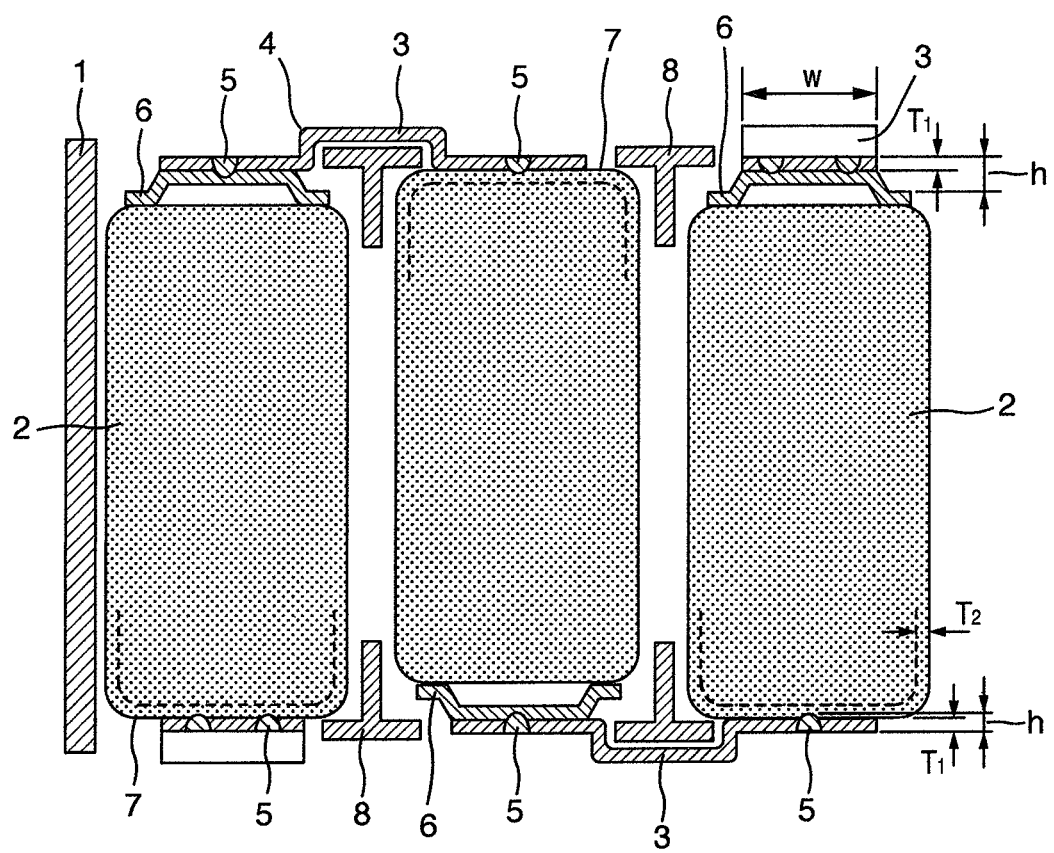
FIG. 3 is a cross-sectional view showing connections between battery positive and negative electrodes shown in FIG. 2.
Figure 4:
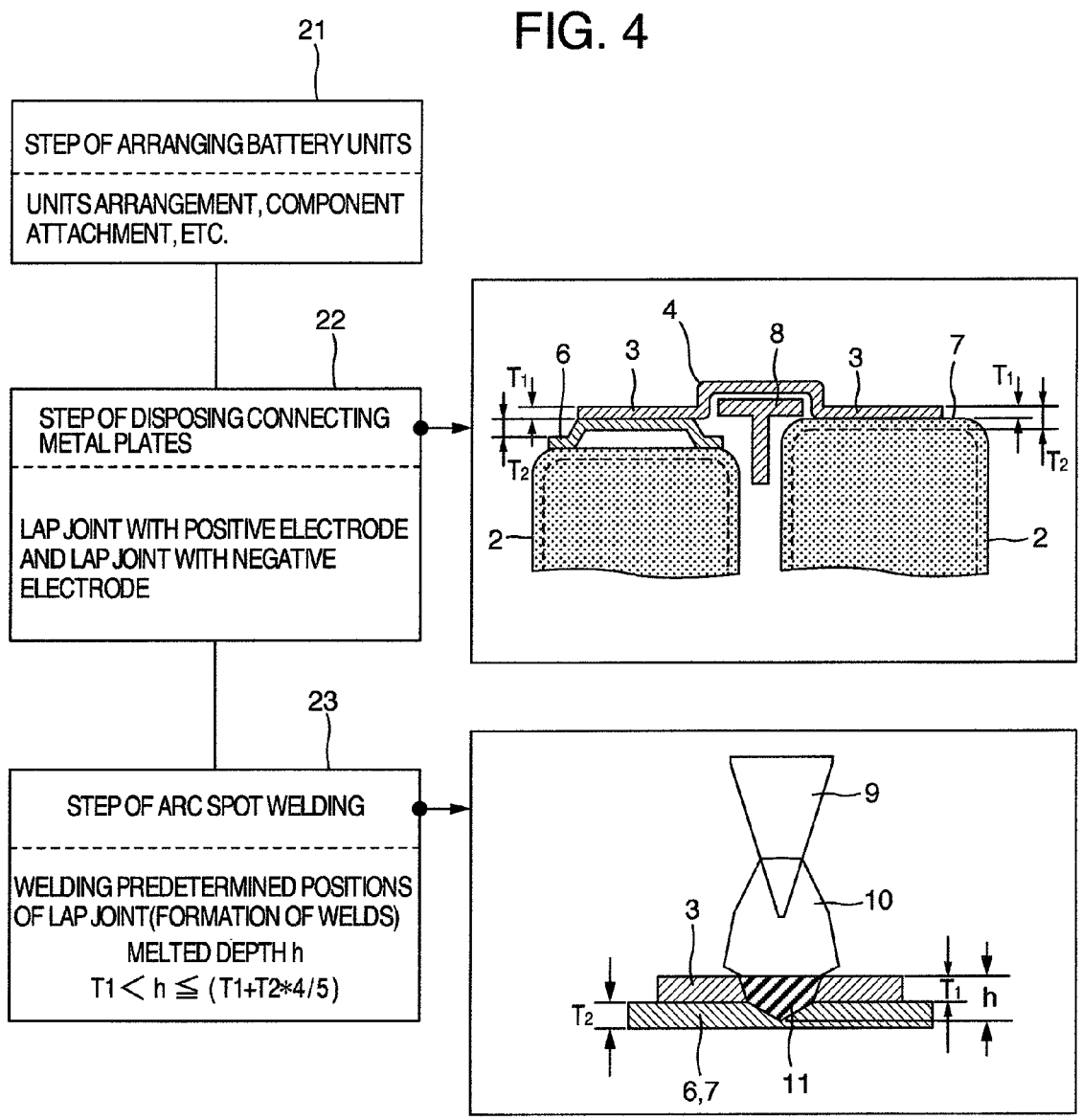
FIG. 4 is a flowchart and a cross-sectional view illustrating the steps of disposing a connecting metallic plate and performing arc spot welding, relating to the battery pack and the welding method therefor according to the present invention.

A battery pack and a welding method therefor according to preferred embodiments will be described with reference to the accompanying drawings. FIG. 1 is a diagram illustrating an arrangement of battery cells, connections between positive and negative electrodes of the battery cells, and current paths of a battery pack according to one exemplary embodiment of the present invention. FIG. 2 is a top view showing one exemplary embodiment of the connections between positive and negative electrodes of the battery cells shown in FIG. 1. FIG. 3 is a cross-sectional view showing the connections between the positive and negative electrodes of the battery cells shown in FIG. 2. FIG. 4 is a flowchart and a cross-sectional view illustrating the steps of disposing a connecting metallic plate and performing arc spot welding that relate to a battery pack and welding method therefor according to the present invention.

As shown in FIG. 1, a set of 40 battery cells 2 is arranged in multiple rows in an electrically insulating case 1. Other arrangement may be used or, if the number of battery cells is small, the battery cells may be arranged in a single row. If 80 battery cells are required, two sets of 40 battery cells may be arranged. Each battery cell 2 is a cylindrical lithium cell. The cells are arranged in such a manner that the positive electrode 6 of a battery cell and the negative electrode 7 of another battery cell are adjacent to each other. The cells are coupled in series through connecting metallic plate 3. In operation of the battery pack, a high current can be output along a current path 12.

As shown in FIGS. 2 to 4, a connecting metallic plate 3 made of copper is disposed on both of the positive electrode 6 of a battery cell 2 and the negative electrode 7 (on the bottom) of another battery cell 2 to form a lap joint. A weld 5 is provided in each of a predetermined position on the connecting metallic plate 3 on the battery positive electrode 6 and a predetermined position on the connecting metallic plate 4 on the battery negative electrode 7. The welds 5 are formed by applying arc spot welding. The battery positive electrode 6 and the battery negative electrode 7 are made of steel. The both surfaces of the steel electrodes are plated with Ni in order to increase the corrosion resistance. Two welds 5 are formed on the top surface of each connecting metallic plate 3 on the battery positive electrode 6 side of one battery cell and two welds 5 are formed on that metallic plate 3 on the battery negative electrode 7 side of the other battery cell by applying arc spot welding. The distance between the position in which each weld 5 is formed and either edge may be approximately or near w/4, for example, where w is the width of the connecting metallic plate 3. The welds may be provided in any other positions that can be readily welded. If one weld 5 is to be formed on each of the battery positive electrode 6 side and the battery negative electrode 7 side, the weld 5 may be provided about or near the center of the plate width w. Even if the number of welding points is small, welds having a good welding quality and high tensile strength can be made and the battery positive and negative electrodes can reliably coupled with each other while the man-hours required for welding can be reduced.

By forming welds 5 by arc spot welding, the connection resistance between battery electrodes can be reduced. Thus, a battery pack that exhibits only a small conduction loss during battery charging and discharging can be provided. In particular, because the electric resistance of copper is significantly smaller than those of nickel and steel materials (Cu: 1.55<Ni: 6.58<Fe:8.71($\times 10^{-6}$ $\Omega \cdot$cm)), the use of connecting metallic plate 3 made of copper can significantly reduce connection resistance. In addition, welds can be formed at a lower cost with copper than with nickel. Furthermore, the connecting metallic plate 3 made of copper can be reliably welded by arc spot welding and welds 5 that have a good welding quality and a high tensile strength can be provided. It should be noted that conventional Joule-heat-based resistance welding (spot welding) methods cannot be applied to copper, because it is difficult for those methods to weld copper having a small electric resistance.

The weld penetration depth h of the weld 5 is made greater than the thickness T1 of the connecting metallic plate 3 (upper plate) and smaller than the thickness T2 of the battery positive electrode 6 or battery negative electrode 7 (lower plate) plus the thickness T1, that is, $T1 \leq h \leq (T1+T2 \times 4/5)$, so that the weld 5 with a weld penetration depth that does not melt the lap joint to its bottom can be reliably provided.

The battery cells 3, or a battery pack, of the exemplary embodiment shown in FIGS. 1 to 3 are lithium battery cells. However, they may be other types of cells such as nickel-hydrogen battery cells. The welding method of the present invention is capable of providing welds 5 having a good welding quality and a high tensile and a battery pack that conducts electricity with only a small loss during charging and discharging of the battery cell. Two or more folded portions 4 are formed on the connecting metallic plate 3 at distances from and above the level of welds 5. The folded portions 4 can reduce stresses applied on the welds 5 by restraint due to integration of the battery pack and vibrations due to in-vehicle operation.

As shown in FIG. 4, a predetermined number of battery cells 2 are arranged in an insulating case, lines such as a signal lines for detecting an output voltage are wired and required components are attached at battery cell arranging step 21. At the next, connecting metallic plate disposing step 22, a connecting metallic plate 3 made of copper is disposed on the positive electrode 6 of a battery cell 2 and the negative electrode 7 of another battery cell 2 to form a lap joint. The periphery of each battery cell 2 is sealed with a thin insulating sheet (not shown) except the battery positive and negative electrodes 6 and 7. The battery cells 2 are isolated from each other beforehand by an insulating block frame 8. The battery positive and negative electrodes 6 and 7 are exposed so that arc welding can be applied. The lap joint is a dissimilar-metallic joint between an upper plate made of copper, which is the connecting metallic plate 3, having a thickness T1 greater than or equal to 0.5 mm and less than or equal to 1.5 mm and a lower plate made of steel, which is the battery positive electrode 6 or battery negative electrode 7 of battery cell, having a thickness T2 greater than or equal to 0.5 mm and less than or equal to 1.5 mm. The both surfaces of the steel of the case of the battery cell 2 and the battery positive and negative electrodes 6 and 7 of the battery cell 2 are plated with nickel in order to increase the corrosion resistance. The thickness of the Ni plating is greater than or equal to 1 μm and less than or equal to 10 μm so that arc welding of the dissimilar metallic joint between copper and Ni-plated steel can be made.

At the next, arc spot welding step 23, the lap joint between the connecting metallic plate 3 and the battery positive electrode 6 or battery negative electrode 7 is welded 11 by an electric arc 10 using a non-consumable electrode method. In particular, arc spot welding at the welding step 23 is performed so that the weld penetration depth h is in the range $T1 < h \leq (T1+T2 \times 4/5)$, where T1 is the thickness of the connecting metallic plate 3 and T2 is the thickness of the battery positive electrode 6 or negative electrode 7. The details of the welding will be described below in detail with reference to FIG. 5.

Figure 5:
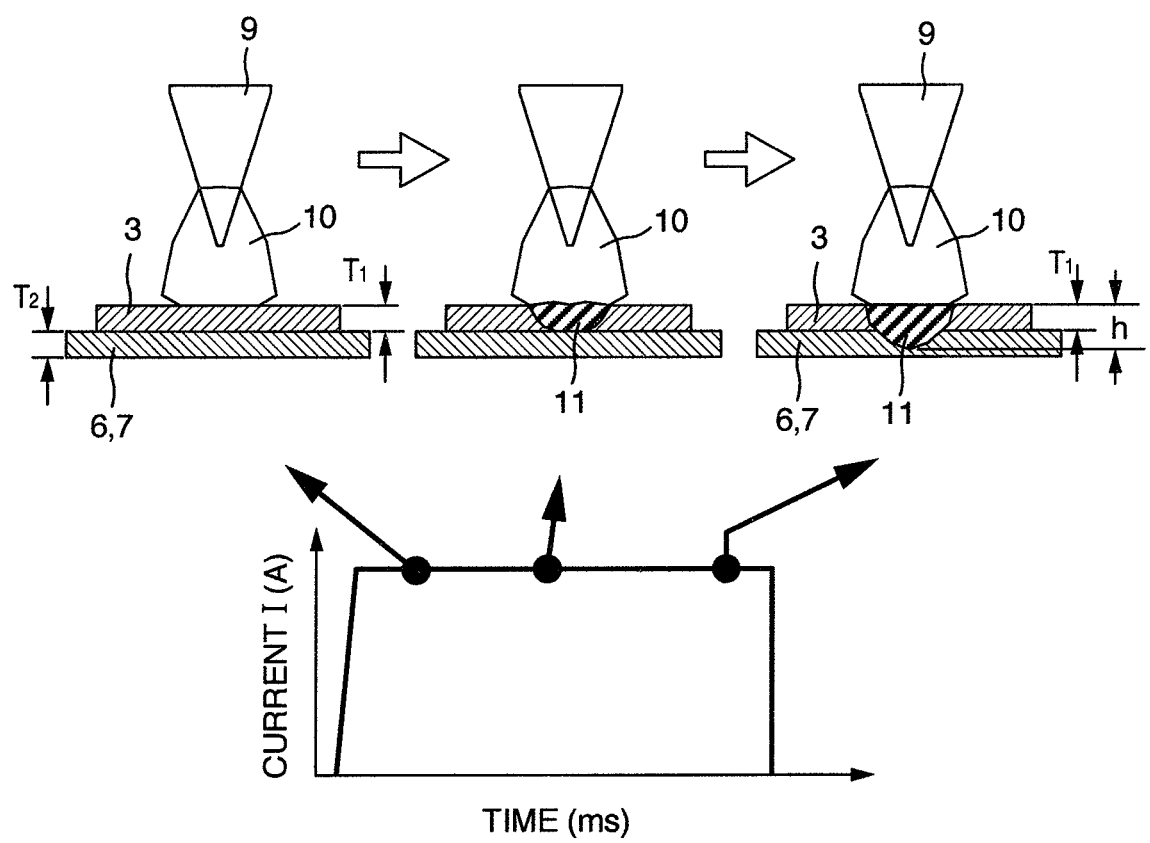
FIG. 5 is a cross-sectional view showing a process for welding a lap joint between battery electrodes by arc spot welding and a diagram showing the relationship between welding current and time.

FIG. 5 shows a cross-sectional view illustrating the step of welding the lap joint between electrodes using arc spot welding and a diagram illustrating the relationship between welding current and time. Shown in FIG. 5 are: (1) arc heating of the connecting metallic plate at the top, (2) melting of the connecting metallic plate, (3) welding to the battery positive or negative electrode at the bottom, and (4) current waveform with time. The arc heat source used in the exemplary embodiment is an electric arc 10 generated by using a non-consumable tungsten welding electrode 9. Predetermined welding conditions (current and welding time) are set in a welding power supply to generate the electric arc 10. The electric arc 10 is generated in a shielding gas (Ar gas) atmosphere, not shown, to cause a current I (A) to be output for a predetermined time T (ms) as shown in part (4) of FIG. 5. First, the connecting metallic plate 3 at the top is heated by the heat of the arc to weld 11, then the melted portion is welded to the battery positive electrode 6 or negative electrode 7 at the bottom by heat conduction and arc force. This is moderate-penetration welding performed for a short time in such a manner that the lower plate is not melted to its bottom. The melted portion freezes after the arc is removed. Thus, a high-quality weld 5 without backside melting or crack can be provided. During welding, preferably a holding tool (not shown) is used to hold the upper, connecting metallic plate 3 and the lower plate (battery positive electrode 6 or negative electrode 7) so that they are firmly in contact with each other. It is desirable that there should be no gap in the joint. However, the arc force will facilitate welding even if there is a small gap.

Even though the welding is dissimilar-metallic lap joint welding between the copper connecting metallic plate 3 and steel battery positive electrode 6 or negative electrode 7, they can be reliably welded. In particular, Cu, which has a low melting point, is combined with Fe, which has a high melting point, through the medium of Ni plating (the melting points of the metals are: Cu (1083° C.)<Ni (1455° C.)<Fe (1539° C.)) to form a good thin layer of a mixture of Cu and Fe without cracks. Thus, a weld 5 with a high welding quality and tensile strength can be provided. Because both surfaces of the battery positive electrode 6 or negative electrode 7 made of steel are plated with Ni, dissimilar-metallic arc welding can be applied regardless of whether the upper plate, namely the connecting metallic plate 3, made of copper is plated with Ni or not. Thus, a high-quality weld 5 without cracks can be provided. It should be noted that Ni plating less than 1 μm in thickness is undesirable because the steel can be exposed in a small flaw and the corrosion resistance is likely to be decreased. On the other hand, Ni plating greater than 10 μm in thickness is also undesirable because thick plating requires much time and poor junction can result from arc welding.

The depth h of weld penetration in a weld 5 is such that $T1 < h \leq (T1+T2 \times 4/5)$. Therefore, a weld 5 having a good quality without backside melting or cracks can be provided and the Ni plating on the backside of the lower plate that remains after the welding can maintain the corrosion resistance of the plate. Moderate-penetration welding without backside melting can be achieved by choosing appropriate welding conditions that will result in shallow penetration or heat input conditions equivalent to such conditions beforehand and by providing the conditions during welding. It should be noted that if welding penetration depth h is less than the thickness T1 of the upper plate, poor welding may result; if on the other hand the weld penetration depth h is greater than $(T1+T2 \times 4/5)$, backside melting is likely to occur, which undesirably can decrease corrosion resistance and cause battery electrolyte leakage. Furthermore, if the thickness T1 of the connecting metallic plate 3 is less than 0.5 mm, the strength of the plate and therefore the strength of the weld 5 is decreased, which will result in a structure vulnerable to vibration. If on the other hand the thickness T1 exceeds 1.5 mm, thermal diffusion to the connecting metallic plate 3 undesirably increases, which may inhibit arc spot welding. Furthermore, if the thickness T2 of the positive electrode 6 or negative electrode 7 of a battery cell 2 is less than 0.5 mm, the strength of the plate and therefore the strength of the weld 5 is decreased, which will result in a structure vulnerable to vibration. On the other hand, it is undesirable that the thickness T2 exceeds 1.5 mm because deep-draw molding becomes difficult to accomplish, the weight of the plate increases, and arc welding also becomes difficult to accomplish.

The welding positions on the connecting metallic plate 3 are flat. However, a metallic plate whose backside has a projection formed on it may be used. Even in the case of such a connecting metallic plate, a weld 5 having a high welding quality and tensile strength can be provided by applying the welding method of the present invention and the connection resistance between electrodes can be reduced. Thus, a battery pack that exhibits only a small conduction loss during battery charging and discharging can be provided.

Table 1 shows an example of results of measurement of connection resistance between battery positive and negative electrodes and shows measurements on samples in which a connecting metallic plate made of copper plated with Ni is arc-welded and samples in which a connecting metallic plate made of nickel is resistance-welded. The connection resistances were measured with a Hi TESTER. The resistance value between the positive electrode of a battery cell 2 and the negative electrode of another battery cell 2 (between points A and B) as shown in FIG. 2 were measured by using an AC 4-probe method. As shown in Table 1, the connection resistance (average of measurements on three samples) between positive and negative electrodes welded with a connecting metallic plate made of copper using 2-point welding (arc welding) is 0.27 mΩ, which is about ⅓ of the connection resistance (0.76 mΩ) between positive and negative electrodes welded with a connecting metallic plate made of Ni by 4-point welding (conventional resistance welding). For 1-point welding, the connection resistance is also small, 0.39 mΩ. The reason why the 2-point welding and 1 point welding differ in connection resistance lies in the difference in the cross-sectional area of junction. Thus, the use of a copper connecting metallic plate reduces the connection resistance between battery positive and negative electrodes and conduction loss during battery charging and discharging, contributing to improvement of battery life. In addition, the battery cells can be manufactured at a lower cost than those made of nickel.

TABLE 1

|  | Material of connecting metallic plate | | |
|---|---|---|---|
|  | Copper plated with Nickel | Copper plated with Nickel | Nickel |
| Thickness (mm) | 0.8 | 0.8 | 0.5 |
| Welding type | Arc welding | Arc welding | Resistance welding |
| A number of welding points (for each of negative and positive electrodes) | 2 | 1 | 4 |
| A number of measured points | 3 | 3 | 10 |
| Average electric resistance (mΩ) | 0.27 | 0.39 | 0.76 |

Figure 6:
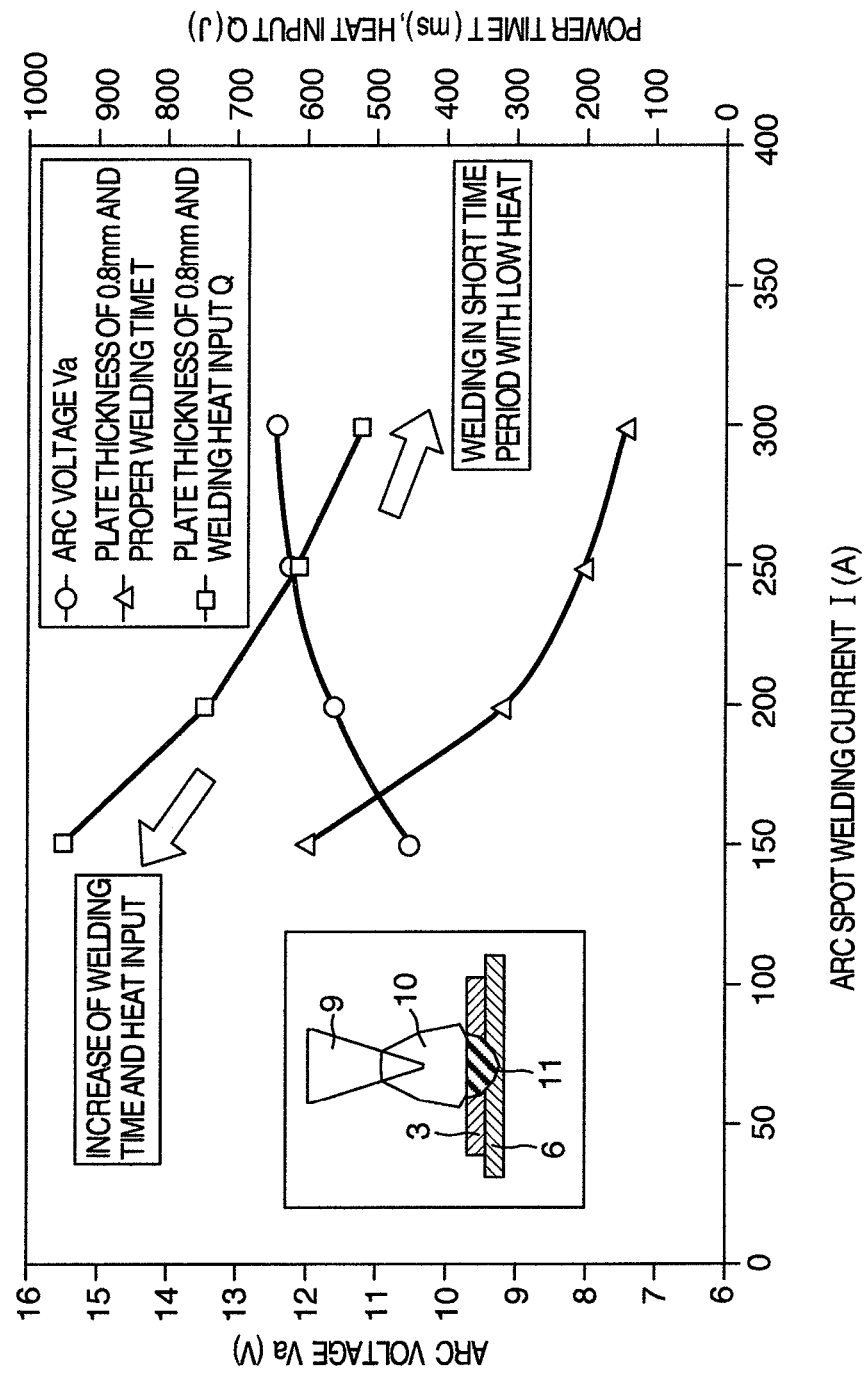
FIG. 6 shows the relationship among current, ark voltage, proper welding time, and heat input in battery cell welding in one exemplary embodiment.

FIG. 6 shows an example illustrating the relationship among arc welding current, arc voltage, proper welding time, and heat input in battery welding. The example shows dissimilar-metallic welding between a 0.8-mm-thick connecting metallic plate 3 (copper plated with Ni) and 0.8-mm-thick battery positive electrode 6 (steel plated with Ni) and proper welding conditions that enable welding 11 without backside melting. In arc spot welding, samples were welded in a short time at low heat input when a high current I was used. When a low current I is used, proper time T and heat input Q at which welding can be achieved increased because of decreases in arc force and heat conduction. Arc voltage Va increased with increasing current I. Heat input Q (J) can be calculated from arc voltage Va (V) and time T (ms) as $Q = I \times Va \times T/1000$.

When a battery positive electrode 6 or negative electrode 7 having a thickness less than 0.8 mm is to be welded, it is preferable that the proper welding time T should be set to a value indicated by the relationship between the arc welding current and time shown in FIG. 6. When a thicker battery positive or negative electrode 6 or 7 having a thickness of 1 mm is to be welded, it is preferable that the proper time T should be set to a greater value. By welding under welding conditions suitable for the thickness of a plate to use, a high-quality weld 5 without backside melting or cracks can be provided. Arc force will facilitate welding even if there is a small gap.

Figure 7:
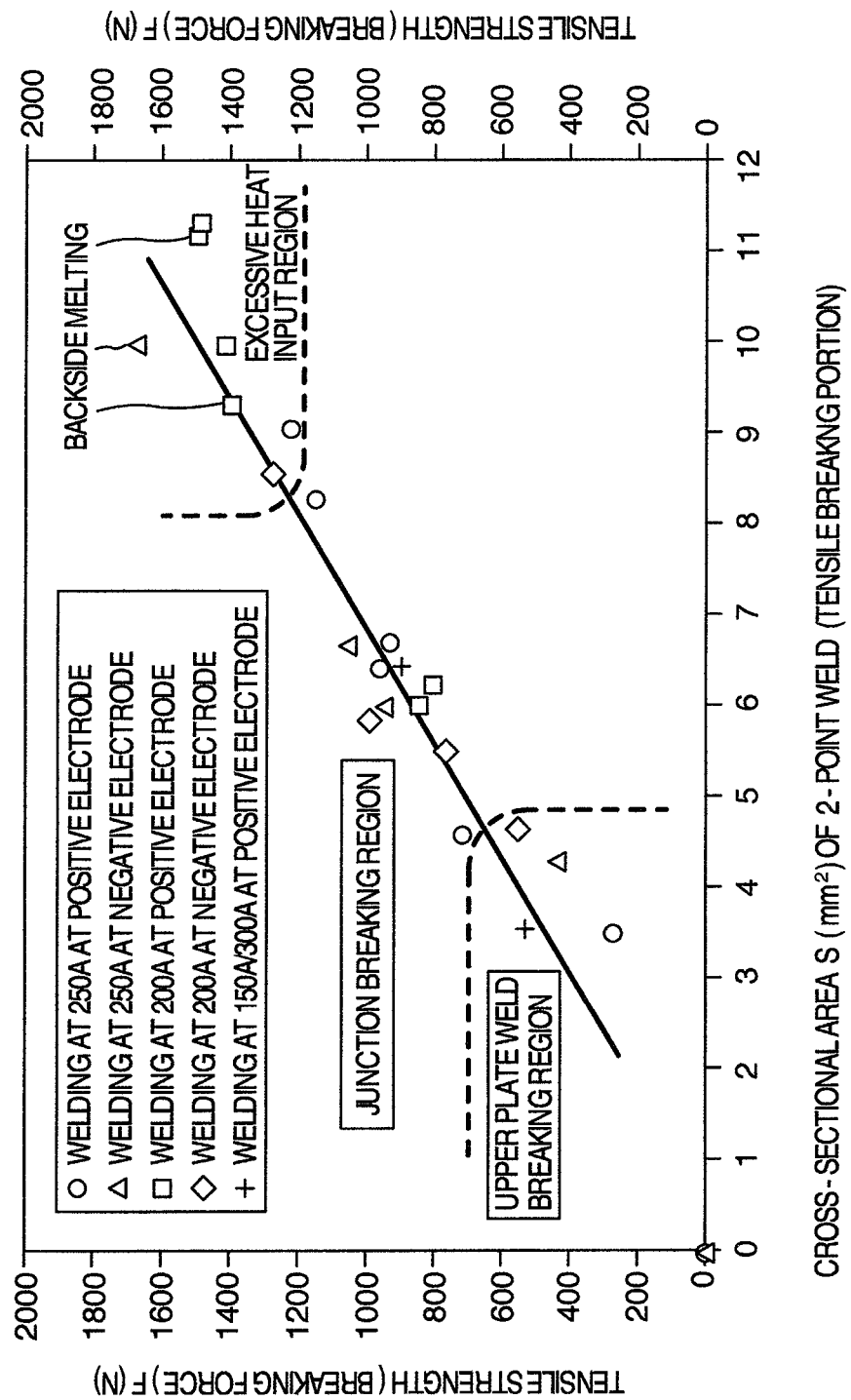
FIG. 7 shows the relationship between the cross-sectional area and tensile strength of a 2-point weld made by arc spot welding in one exemplary embodiment.

FIG. 7 shows an example illustrating the relationship between the cross-sectional area of a 2-point weld made by arc spot welding and the tensile strength. The cross-sectional area S was changed by changing the welding current and time and was measured and calculated from broken-out sections after tensile tests. As shown in FIG. 7, the tensile strength F (breaking force) of the 2-point weld increased in approximate proportion to the cross-sectional area S. When the junction area S was less than 5 mm², the weld broke at the junction, indicating that the tensile strength F is low (less than 650 N). When the junction area was $5 \leq S \leq 8$ mm², the weld broke at the melting portion in the upper plate, achieving a high tensile strength ($650 \leq F \leq 1200$ N). When the junction area S exceeded 8 mm², the tensile strength further increased but backside melting occurred due to an excessive heat input.

As has been described, the battery packs and welding method of the present invention are capable of reducing the connection resistance between battery electrodes and therefore reducing conduction loss during battery charging and discharging. Even though the welding is welding of copper, which is difficult to weld, and dissimilar-metallic lap joint welding between copper and steel, a high-quality weld exhibiting a high tensile strength can be produced by arc spot welding.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A battery pack comprising a plurality of battery cells and a connecting metallic plate connecting an electrode of one of the battery cells to an electrode of another one of the battery cells, wherein the connecting metallic plate is disposed on a positive electrode of the one of the battery cells and a negative electrode of said another one of the battery cells, and the connecting metallic plate and each of the positive and negative electrodes are fixed to each other to form a lap weld joint by an arc spot welding,
   wherein the connecting metallic plate is comprised of copper, and each of the positive and negative electrodes is comprised of one of high carbon steel and low carbon steel, and is plated with nickel so that the connecting metallic plate and each of the positive and negative electrodes are fixed to each other by the arc spot welding through the nickel.

2. The battery pack according to claim 1, wherein the connecting metallic plate includes surfaces being opposite to each other in a thickness direction of the plate and plated with nickel.

3. The battery pack according to claim 1, wherein at least one of the positive and negative electrodes includes surfaces being opposite to each other in a thickness direction of the at least one of the positive and negative electrodes and plated with nickel.

4. The battery pack according to claim 1, wherein a thickness of the nickel is not less than 1 μm and not more than 10 μm.

5. The battery pack according to claim 1, wherein the connecting metallic plate and each of the positive electrode of the one of the battery cells and the negative electrode of said another one of the battery cells are fixed to each other at least one position where the arc spot welding was performed.

6. The battery pack according to claim 1, wherein a thickness of the connecting metallic plate is not less than 0.5 mm and not more than 1.5 mm, and a depth of a melted region of the lap weld joint from a surface of the connecting metallic plate opposite in a thickness direction of the connecting metallic plate to another surface thereof facing to each of the positive and negative electrodes is greater than a total amount of 0.1 mm and a thickness of the connecting metallic plate and smaller than a total amount of the thickness of the connecting metallic plate and four fifths of a thickness of each of the positive and negative electrodes.

7. The battery pack according to claim 1, wherein the connecting metallic plate includes at least two bent portions between the lap weld joints fixed to the positive and negative electrodes.

8. The battery pack according to claim 1, wherein a cross sectional area of the lap weld joint taken along a boundary between the connecting metallic plate and each of the positive and negative electrodes is 5-8 mm² as seen in a thickness direction of the connecting metallic plate.

9. A battery pack comprising a plurality of battery cells and a connecting metallic plate connecting an electrode of one of the battery cells to an electrode of another one of the battery cells, wherein the connecting metallic plate is disposed on the positive electrode of the one of the battery cells and the negative electrode of said another one of the battery cells, and the connecting metallic plate and each of the positive and negative electrodes are fixed to each other to form a lap weld joint by an arc spot welding in which a tungsten electrode is used with one of a welding condition for preventing a surface of each of the positive and negative electrodes opposite in a thickness direction of each of the positive and negative electrodes to another surface thereof facing to the connecting metallic plate from being melted, wherein the connecting metallic plate is comprised of copper, and each of the positive and negative electrodes is comprised of one of high carbon steel and low carbon steel, and is plated with nickel so that the connecting metallic plate and each of the positive and negative electrodes are fixed to each other by the arc spot welding through the nickel.

10. A battery pack comprising a plurality of battery cells and a connecting metallic plate connecting an electrode of one of the battery cells to an electrode of another one of the battery cells, wherein the connecting metallic plate includes copper and is disposed on the positive electrode of the one of the battery cells and the negative electrode of said another one of the battery cells to form a lap joint, and the connecting metallic plate and each of the positive and negative electrodes are fixed to each other at a welded portion by an arc spot welding applied to a surface area of the connecting metallic plate opposite in a thickness direction of the connecting metallic plate to another surface area facing to the positive electrode and a further surface area of the connecting metallic plate opposite in the thickness direction of the connecting metallic plate to another further surface area facing to the negative electrode, and a depth of melted region of the welded portion is greater than a thickness of the connecting metallic plate and smaller than a total amount of the thickness of the connecting metallic plate and four fifths of a thickness of each of the positive and negative electrodes, wherein the connecting metallic plate is comprised of copper, and each of the positive and negative electrodes is comprised of one of high carbon steel and low carbon steel, and is plated with nickel so that the connecting metallic plate and each of the positive and negative electrodes are fixed to each other by the arc spot welding thorough the nickel.

11. The battery pack according to claim 10, wherein the connecting metallic plate has a main component of copper and a thickness not less than 0.5 mm and not more than 1.5 mm, at least one of the positive and negative electrodes has a main component of steel and a thickness not less than 0.5 mm and not more than 1.5 mm, and surfaces of the at least one of the positive and negative electrodes opposite to each other in a thickness direction thereof have respective layers formed of Nickel.

12. A method for connecting through a connecting metallic plate an electrode of one of battery cells to an electrode of another one of the battery cells, comprising the steps of: disposing the connecting metallic plate whose main component is copper on the positive electrode of the one of battery cells and on the negative electrode of said another one of the battery cells to form a lap joint; and applying an arc spot welding to each of a position on the connecting metallic plate above the positive electrode and another position on the connecting metallic plate above the negative electrode, wherein each of the positive and negative electrodes is comprised of one of high carbon steel and low carbon steel, and is plated with nickel so that the connecting metallic plate and each of the positive and negative electrodes are fixed to each other by the arc spot welding through the nickel.

13. The method according to claim 12, wherein a depth of melted region of the lap joint is greater than a thickness of the connecting metallic plate and smaller than a total amount of the thickness of the connecting metallic plate and four fifths of a thickness of one of the positive and negative electrodes.

14. The battery pack according to claim 1, wherein the main component of the connecting metallic plate is copper.

15. The battery pack according to claim 9, wherein the main component of the connecting metallic plate is copper.

16. The battery pack according to claim 10, wherein the main component of the connecting metallic plate is copper.

* * * * *